United States Patent [19]
Kroes et al.
[11] 3,794,772
[45] Feb. 26, 1974

[54] ARRANGEMENT FOR INTEGRATING SWITCHING SYSTEMS OF DIFFERENT TYPES

[75] Inventors: Donald P. Kroes, Lisle; Matthew S. Lassen, Chicago, both of Ill.
[73] Assignee: GTE Automatic Electric Laboratories Incorporated, Northlake, Ill.

[22] Filed: Oct. 2, 1972
[21] Appl. No.: 293,987

[52] U.S. Cl. .......... 179/16 EC, 179/18 E
[51] Int. Cl. .......... H04q 3/48
[58] Field of Search .......... 179/16 EC

[56] References Cited
UNITED STATES PATENTS
3,449,521 6/1969 Warman et al. .......... 179/16 EC

*Primary Examiner*—William C. Cooper
*Attorney, Agent, or Firm*—Robert J. Black

[57] ABSTRACT

An arrangement for integrating a switching system of the direct controlled type with a switching system of the marker controlled type having common control equipment wherein the existing linefinder groups of the direct control system are equipped with access trunks to connect concentrated traffic from lines to the central switching matrix of the marker controlled system, in the same manner as the line concentrating matrices and originating junctors function for the lines in a marker controlled system. One or several ranks of selectors and connectors also distribute traffic from central switching matrix to the lines in the same manner as the line concentrating matrices and terminating junctors function for the lines in a marker controlled system. In order that the common control features can be applied to the lines of the direct control system, the marker controlled system further is arranged to obtain the line number identity by means of detection equipment associated with the linefinders.

6 Claims, 4 Drawing Figures

ARRANGEMENT FOR INTEGRATING SWITCHING SYSTEMS OF DIFFERENT TYPES

BACKGROUND OF THE INVENTION

This invention relates generally to telephone exchanges with interworking switching systems of a basically different structure and control, and more particularly, to an arrangement for integrating one switching system of the direct controlled type with another switching system of the marker controlled type having common control equipment.

Most telephone exchanges presently in use are of the direct controlled type utilizing step-by-step equipment, such as well-known Strowger switches. This equipment has proven to be of extreme reliability, and many existing exchanges are equipped with equipment which still has many years of serviceable life. However, when there is need to add or replace such equipment in view of the present trend toward high speed electronic equipment, it may be desirable that a common control switching unit, such as that disclosed in U.S. Pat. No. 3,170,041 by K. K. Spellnes, be added along side of the existing direct controlled switching equipment.

However, using these two different types of switching equipment together in the same office raises a problem of compatability. Most prior methods for interconnecting these two different types of switching systems in a central office have been on the basis of simply intertrunking the two. The result has been that after intertrunking, the benefits and features of the common control can only be applied to the lines of the common control switching unit. There is also an inherent inefficiency in intertrunking the two separate switching units, and in many cases, separate trunk groups for each system are required to connect with other offices. Two such arrangements for interworking of switching units are disclosed in U.S. Pat. No. 3,466,401 by A. S. Cochran et al. and U.S. Pat. No. 3,342,942 by W. C. Miller et al.

Accordingly, it is an object of the present invention to provide an arrangement for integrating a switching unit of the direct control type with another switching unit of the marker controlled type having common control equipment.

More particularly, it is an object to provide an arrangement for integrating two such systems in a fashion such that the benefits and features of the common control can be applied to the lines of both systems.

SUMMARY OF THE INVENTION

According to the invention, the existing linefinder groups of the direct control system are equipped with access trunks to connect concentrated traffic from lines to the central switching matrix of the marker controlled system, in the same manner as the line concentrating matrices and originating junctors function for the lines in a marker controlled system. One or several ranks of selectors and connectors also distribute traffic from central switching matrix to the lines in the same manner as the line concentrating matrices and terminating junctors function for the lines in a marker controlled system. In order that the common control features can be applied to the lines of the direct control system, the marker controlled system further is arranged to obtain the line number identity by means of detection equipment associated with the linefinders.

BRIEF DESCRIPTION OF DRAWINGS

For a fuller understanding of the nature and objects of the invention, reference should be had to the following detailed description taken in connection with the accompanying drawings, in which.

Similar reference characters refer to similar parts throughout the several views of the drawings.

DESCRIPTION OF THE INVENTION

Figure 1:
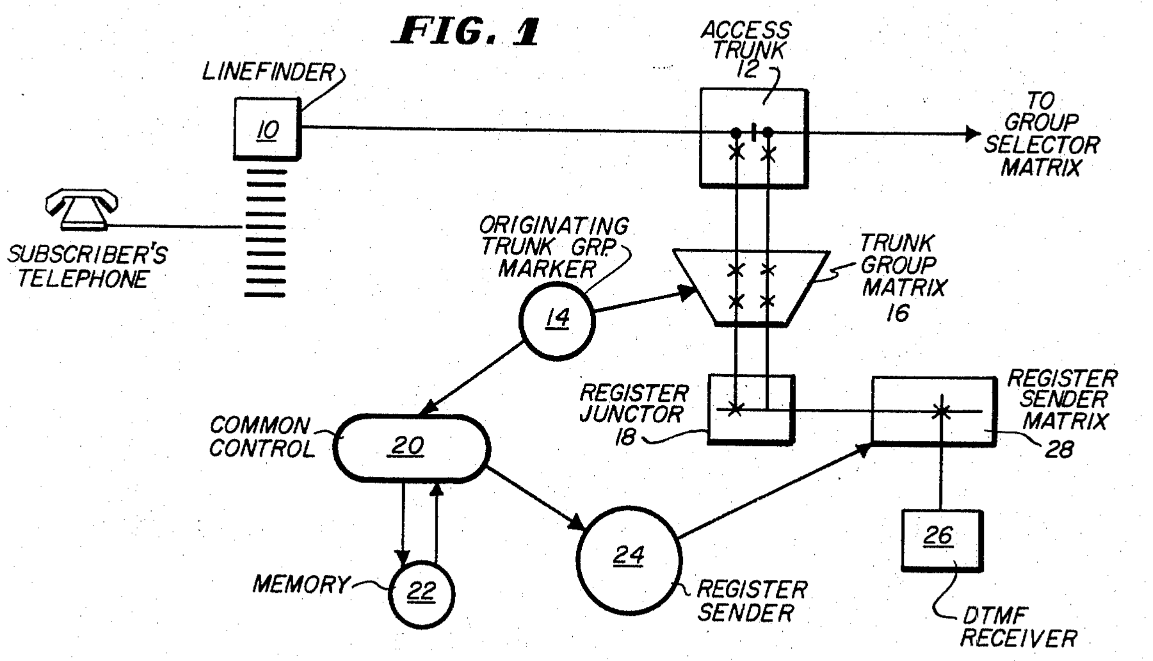
FIG. 1 is a functional block diagram of the arrangement of the present invention, in an originating call.

Briefly, in a direct control step-by-step system, a subscriber requiring an outgoing trunk for inter-office communication initiates the operation by lifting his handset which operates a line relay in the line circuit of the calling line. The calling line is now connected to a line finder selector link and receives dial tone. Operation of the dial at the subscriber station transmits loop interruption pulses which cause a first selector to step vertically to the level corresponding to the first digit, and during the interdigital pause, the selector automatically steps in the rotary direction until an idle trunk is found and the connection is extended to a second selector. The succeeding selectors in a like manner operate on succeeding digits. After an appropriate one of the digits, the connection is completed to an outgoing trunk circuit and thence to another office which completes the connection in response to the succeeding dialed digits.

In a marker controlled system such as the one disclosed in the above-mentioned U.S. Pat. No. 3,170,041, the common control switching unit comprises two main parts, the transmission path and the common control. The transmission path comprises line matrices controlled by a marker, and selector matrices controlled by a marker. There is also a trunk-to-register matrix which provides access from incoming trunks and various special service trunks to the register-sender group. The line matrix, the selector matrix and the trunk register matrix each comprise an arrangement of crosspoint switching matrices, and the markers employ electronic circuits which provide very high speed operation, and thus make possible the very short holding time in using the markers on a one-at-a-time basis.

The common control comprises register-sender groups and a central control which contains a special computer for call processing, operation analysis and recording, and program upgrading equipment. Time division techniques are used in the register-sender groups. A ferrite core memory is used in the register-sender group for temporary storage, and both a ferrite core and a magnetic drum are used in the common control for semipermanent storage.

In a system of this type, a typical call as processed through the common control crosspoint switching unit to a trunk is initiated when a subscriber lifts the handset. A marker goes into action, by detecting the originating call mark, identifying the calling line, and selecting an idle register junctor within the register-sender. A path is then temporarily established from the calling telephone to the register junctor via line concentrating matrices, an originating junctor and a register access matrix, and the subscriber receives dial tone. The dialed digits are stored temporarily in the memory and coded. Processing is continued as these digits are translated and analyzed for type of incoming call. Instructions are selected from the drum memory and returned to the common control to guide further handling of the call. Upon receipt of the remaining digits, a translation switching instruction corresponding to the called number as stored in the drum memory is returned. The instructions are transmitted to a marker controlling a central switching matrix. The instructions are analyzed by the marker, an idle outgoing trunk is located, and a path established to that trunk group via the central switching matrix. The remaining instructions are directed via that trunk to the succeeding office.

Referring now to the drawings, the manner in which the direct controlled and the marker control systems, hereinafter referred to as the SXS and EAX systems, respectively, are integrated can be seen and described. In FIG. 1, when a subscriber in the SXS system initiates a call by lifting the handset, a line relay in the line circuit of the calling line is operated, and the calling line is connected to a linefinder 10, as during normal SXS operation. In this case, however, an access trunk 12 is seized, and a call-for-service is placed for the originating marker 14 which selects an idle register junctor 18 within the register-sender 24, via the trunk group matrix 16.

During the process of establishing the connection through the trunk-to-register matrix 16, the path information is sent to the common control 20, indicating the access trunk to be served and the register junctor to be used. In this respect, the operation is similar to an incoming trunk call to the EAX system.

The path information is sent to and translated in the system memory 22 into instructions for serving the call, and are returned to the common control 20. The latter sets up the control storage for the call and forwards instructions to set up the register-sender 24 for serving the call. If a DTMF receiver is required, this fact will be indicated by the group number of the incoming access trunk 12 and a DTMF receiver 26 will be attached via the register-sender matrix 28. Dial tone is then returned and the subscriber may begin to enter digits into the system.

Call processing can proceed in one of three different manners. For example, if the SXS system has no ANI equipment and requires no special services other than the addition of DTMF, there is no more special action to be taken to set up the call. Local calls may be dialed directly, and toll calls are handled either on an ONI basis or via CLR. This is the simplest and least expensive arrangement.

A second arrangement makes use of existing ANI equipment, and the fact that no special services other than DTMF are required. In such a case, no additional special action need be taken to set up the call, and local calls may be dialed directly. Toll calls from ANI subscribers also may be dialed directly.

Figure 2:
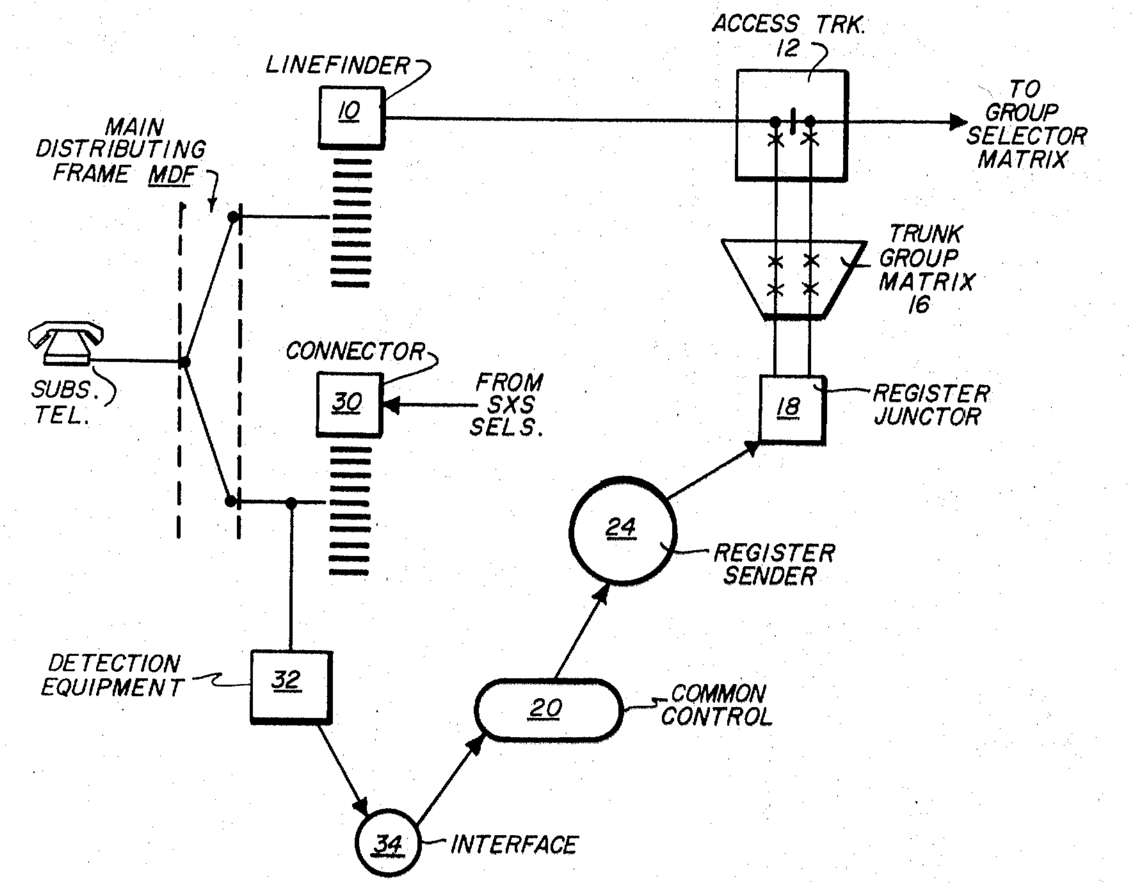
FIG. 2 is a functional block diagram for integrating the systems to provide some of the common control features to the direct control system.

Such an arrangement is shown in FIG. 2. With this arrangement, when a toll call is to be routed, the common control 20 sends instructions to the register-sender 24 to signal the register junctor 18 to request ANI information. The register junctor 18 sends a signal through the trunk-to-register matrix 16 to the access trunk 12, and the latter, in turn, applies a signal to the C-lead to the linefinder 10. This signal is extended to the main distribution frame MDF where it is interconnected with a connector 30 and causes the detection equipment 32 of the SXS system to provide the ANI information. This ANI information is read into the common control 20 via an interface assembly 34, which may be like that used to read in AIOD information from a PABX. The receipt of this ANI information allows the toll call to be billed.

Figure 3:
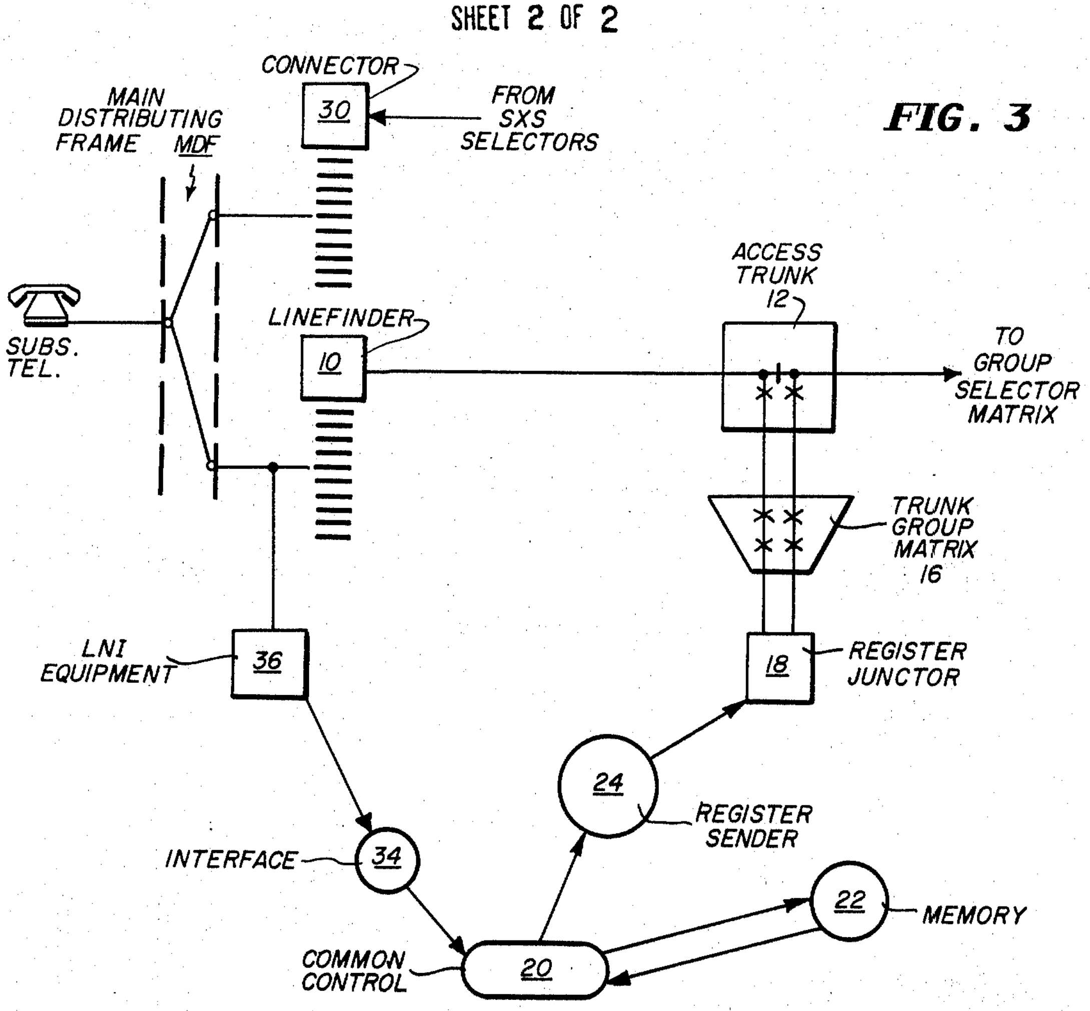
FIG. 3 is a functional block diagram of an arrangement where the lines of the direct control system are fully integrated, illustrating the special action taken before routing a call to determine the line being served and the services to be provided to that line.

In FIG. 3 there is illustrated still another arrangement for integrating the systems such that virtually all of the common control features of the EAX system can be utilized by the SXS system. In this case, special action is taken before routing a call to determine the line being served and the services to be provided to that line.

In this arrangement, just after dial tone is returned on any call, the common control 20 sends instructions to the register-sender 24 to signal the register junctor 18 to request the line number identity information. Again, the register junctor 18 sends a signal through the trunk-to-register matrix 16 to the access trunk 12, and the latter applies a signal to the C-lead to the linefinder 10 which action, in turn, causes the LNI equipment 36 to produce the line number identity. The line number identity information is read into the common control 20, via the interface 34 which again may be similar to the interface used to read in AIOD information from a PABX.

The line number identity information is sent to be translated in the system memory 22 into instructions for serving the call, and these instructions are returned to the common control 20. These instructions should be virtually the same as those returned and stored in the common control for a line of the EAX system, except that the need for a DTMF receiver would not be required since this was already determined from the trunk group identity on a previous translation, as indicated above. If a party test is required, it can be done at a convenient time before routing the call.

On a terminating call, a termination to a line of the SXS system begins when a translation of a called directory number indicates that a call is directed to such a line. In the case of a terminating call, the termination again can proceed in one of two different manners.

Figure 4:
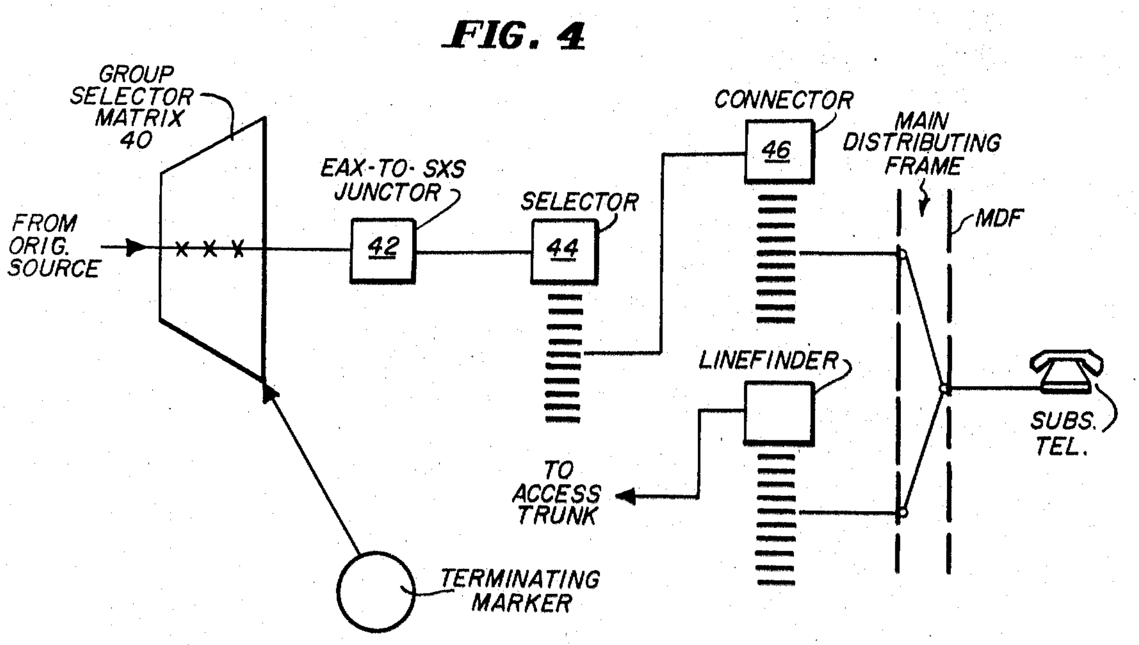
FIG. 4 is a functional block diagram of the arrangement, on a terminating call.

In the simplest and quickest manner, the normal office code ABC translation will be followed by a subsequent code translation to decide whether the call is to be sent to a line of the SXS system or the EAX system. The office is divided by blocks of 1,000 or 100 directory numbers. As illustrated in FIG. 4, if the call is directed to a line of the SXS system, outpulsing will begin immediately after the second translation and is sent through the central switching matrix 40 to a junctor 42 between the SXS and EAX systems to a selector 44. The outpulsing sets up a single, or several selectors, to access a connector 46. The line is accessed by further outpulsing to the connector 46, in standard fashion.

A second arrangement offers freedom for associating a directory number with a connector terminal as well as offering some of the other advantages of the EAX system to the line. With the lines fully integrated, the translation process varies from that described above. In this case, the normal office code ABC translation is followed by a normal number group translation to decide whether the call is to be sent to a line of the SXS system or the EAX system.

For a line of the SXS system, the number group translation yields three or four digits to be outpulsed and a group number for the junctor such as the junctor 42 to be used. The storage is completely arbitrary allowing any terminal of either system to be assigned to any directory number. The outpulsing to the SXS line begins at the end of the dialing rather than during digit reception, but the complete freedom of directory numbers and terminals results.

The line is rung and trip is handled from the connector 46, as is a line busy condition.

It will thus be seen that the objects set forth above among those made apparent from the preceding description, are efficiently attained and certain changes may be made in carrying out the above method and in the construction set forth. Accordingly, it is intended that all matter contained in the above description or shown in the accompanying drawings shall be interpreted as illustrative and not in a limiting sense.

Now that the invention has been described, what is claimed as new and desired to be secured by letters Patent is:

1. In a communication system including an exchange comprising first and second switching units, each said unit having a plurality of subscriber lines, said first unit comprising connector switches including linefinder means which couples to a calling line when a call is initiated; and said second unit comprising a plurality of switching groups including a line concentrating matrix, a central switching netowork and a trunk-to-register matrix, each of which includes a plurality of crosspoint switching devices arranged in coordinate matrices and marker apparatus for controlling the establishment of connections through said crosspoint matrices, register-sender apparatus comprising register means and a plurality of senders, common cntrol means and memory means for receiving, translating and storing path information for setting up said register-sender apparatus for serving the call and for completing a connection between the calling and called lines, an arrangement for integrating said first and second switching units to permit the benefits and features of the common control to be applied to the lines of both siad first and second units comprising a plurality of access trunks adapted to be seized by said linefinder means and to place a call-for-service to said marker apparatus of said trunk-to-register matrix to connect said calling line to said register-sender apparatus, the group number of the incoming access trunk providing an indication of the need for a dual tone multifrequency (DTMF) receiver, and means including said register-sender for coupling a DTMF receiver to said calling line and to return dial tone to indicate that the called line directory number can be entered into said system, said common control means and memory means receiving, translating and storing the path information for setting up said register-sender for serving the call and for completing a connection between the calling and called lines via said central switching matrix.

2. The communication system of claim 1, wherein said first switching unit further comprises Automatic Number Identification (ANI) apparatus, and wherein said arrangement for integrating said first and second units further includes an interface assembly for coupling ANI information into said common control means, said common control means controlling said register-sender means to request said ANI information and said first switching unit in response thereto coupling said ANI information into said common control means via said interface assembly.

3. The communication system of claim 2, wherein said register-sender apparatus signals said access trunk to request said ANI information, said access trunk in response to said signal applying a signal to a control lead to said line-finder means, said signal being extended to a main distribution frame and interconnected with a connector means to initiate the read out and coupling of said ANI information to said common control means via said interface assembly.

4. The communication system of claim 1, wherein said first switching unit further comprises Line Number Identification (LNI) apparatus, and wherein said arrangement further includes an interface assembly for coupling LNI information to said common control means, said common control means controlling said register-sender means to request LNI information and said first switching unit in response thereto coupling said LNI information into said common control means via said interface assembly, said LNI information being coupled into and translated by said memory means into instructions for serving the call and returned to said common control means.

5. The communication system of claim 1, wherein said first switching unit includes connector switches of the terminal per station or terminal per line type including linefinder means, selectors and connectors, and wherein said arrangement for integrating said first and second switching units further includes junctor means coupled between said central switching matrix of said second switching unit and a selector of said first switching group, said common control means and said memory means on a terminating call to a line of said first switching unit providing a first translation for coupling said call through said central switching matrix to said selector and a second translation for driving said selector to access a connector and for driving said connector to access the called line.

6. The communication system of claim 5, wherein said second translation comprises a normal number group translation including a plurality of digits to be outpulsed and a group number for the junctor to be accessed, whereby any terminal of said first and second switching units can be assigned any directory number.

* * * * *